United States Patent
Wouters

(10) Patent No.: US 7,168,794 B2
(45) Date of Patent: Jan. 30, 2007

(54) INK SUPPLY SYSTEM

(75) Inventor: Paul Wouters, Waver (BE)

(73) Assignee: Agfa-Gevaert NV, Mortsel (BE)

( * ) Notice: Subject to any disclaimer, the term of this patent is extended or adjusted under 35 U.S.C. 154(b) by 0 days.

(21) Appl. No.: 10/989,994

(22) Filed: Nov. 16, 2004

(65) Prior Publication Data

US 2005/0128261 A1    Jun. 16, 2005

Related U.S. Application Data

(60) Provisional application No. 60/528,329, filed on Dec. 10, 2003.

(30) Foreign Application Priority Data

Nov. 21, 2003  (EP) ................................. 03104305

(51) Int. Cl.
    *B41J 2/17*   (2006.01)
(52) U.S. Cl. ....................................................... 347/84
(58) Field of Classification Search .................. 347/84, 347/87, 85–86
    See application file for complete search history.

(56) References Cited

U.S. PATENT DOCUMENTS 2,915,325 A    12/1959  Foster

| 5,963,238 | A | 10/1999 | Scheffelin et al. |
| 6,032,010 | A | 2/2000 | Kim et al. |
| 6,041,805 | A | 3/2000 | Gydesen et al. |
| 6,450,630 | B2 * | 9/2002 | Kanaya et al. ................. 347/86 |
| 6,550,899 | B1 | 4/2003 | Cowger et al. |
| 6,565,199 | B2 * | 5/2003 | Ujita et al. .................... 347/86 |
| 2001/0012038 | A1 | 8/2001 | Gasvoda |
| 2002/0001009 | A1 | 1/2002 | Gasvoda et al. |
| 2002/0180848 | A1 | 12/2002 | Anderson et al. |
| 2003/0202060 | A1 | 10/2003 | Billota et al. |

FOREIGN PATENT DOCUMENTS

| EP | 0687846 A1 | 12/1995 |
| EP | 1 277 584 A2 | 1/2003 |
| GB | 678556 | 9/1952 |

* cited by examiner

*Primary Examiner*—K. Feggins
(74) *Attorney, Agent, or Firm*—Robert A. Sabourin

(57) ABSTRACT

An ink supply system for feeding ink from an ink cartridge to an inkjet printer includes a dry-break valve system and two coupling elements. Preferably use is made of a hollow tappet rod as a coupling element. The valves in the system are automatically opened in a single action during coupling without introduction of air into the system. The system allows for a high volume ink flow and prevents leakage from the ink cartridge and the printer due to pressure changes.

15 Claims, 1 Drawing Sheet

INK SUPPLY SYSTEM

This application claims the benefit of U.S. Provisional Application No. 60/528,329 filed on Dec. 10, 2003.

FIELD OF THE INVENTION

The present invention relates to a solution for supplying ink to an inkjet printer. More specifically the invention is related to an ink supply system for feeding ink from a cartridge to an ink jet printer.

BACKGROUND OF THE INVENTION

Inkjet Printing

Nowadays a lot of printed matter is produced carrying a reproduction of a colour image. A large part of these colour prints are produced using offset printing but in office and home environments a lot of colour prints are made using relatively small printing apparatuses.

One of the possible printers used is an inkjet printer. In an inkjet printer drops of ink are jetted out of nozzle toward a receiving layer which may be e.g. specially coated paper. Usually an inkjet print head has an array of nozzles, each nozzle jetting ink to different locations at the same time. The ink jetted out of the nozzles by use of, e.g. thermal or piezoelectric actuators, creating a pressure wave. It is normally the intention that the size of the droplets can be kept constant or that there is a good control of the droplet size in ink jet printers capable of recording variable droplet sizes.

Shuttling Print Head with Header Tank

Inkjet printing technology is also used in large format, high volume printers in more industrial applications. Inkjet print heads can be as large as the transversal size of an image or text to be printed but usually the size of the print head is smaller. Page wide print heads are still expensive and less reliable than smaller types.

An inkjet printer prints an image when a receiving sheet, e.g. a sheet of paper, is transported in one direction and passed gradually underneath a printing station of the printer. A print head which has a size smaller than the receiving sheet shuttles transversal over the receiving sheet and consecutively records one or more lines when shutting over the sheet paper. The image is composed gradually. It is possible that several print heads are used to record different colours and a colour image is recorded by superposition of the different colour images.

Small printers usually have a small cartridge, optionally with integrated print head nozzles, containing only a limited amount of ink. When empty these cartridges have to be replaced. In order to enable continuous operation of a print head, an ink tank containing an ink supply can be coupled to the print head.

High end inkjet printers in industrial applications having a high throughput or large formats consume a large amount of ink. The inkjet print head of a high end printer is coupled to an ink tank mounted on the shuttling carriage carrying the print head. This ink tank is called a header tank and can be refilled out of a large capacity ink tank or cartridge which is stationary in the apparatus.

It is possible that a fixed large capacity ink tank is provided but usually the header tank is coupled to an exchangeable ink cartridge which acts as a main supply. This has the advantage that it is easier to change the type of ink used in an inkjet printer. By replacing the ink cartridge the printer can be quickly converted to print with an another colour or type of ink. When using a fixed large capacity ink tank this is more difficult.

As mentioned above most systems use a header tank close to the inkjet printhead to supply the ink to the inkjet printhead, but it is also possible that the printhead is directly coupled to the ink cartridge or main ink tank of the printer.

The ink cartridge used has to be connected to the ink supply system of the inkjet printer. Even when the printer has a fixed large capacity ink tank, the tank has to be refilled using an ink cartridge.

Hitherto different systems have been used. In US 2002/180 848, herein incorporated by reference in its entirety for background information only, a self-sealing plug is pierced by a needle like hollow instrument. When separating the plug reseals itself after the needle is retracted.

In EP 1 277 584, herein incorporated by reference in its entirety for background information only, a joint pipe opens a valve in the valve mechanism of the ink container. Leakage from the opening of the inkjet printer is avoided by capillary forces of the small needle-like opening.

Coupling systems do exist wherein the needle having a lateral opening at the end is covered by a sliding sealing element. When retracting the cassette a rubber sheath slides upward to cover the opening in the side of the needle. This avoids evaporation of ink at the opening which could block the opening. This system however has certain drawbacks as noted below.

The sealing of the opening in the needle is relatively low. The rubber sheath has to slide over the needle so the radial pressure exerted on the wall of the needle is rather low to enable the sliding of the sheath. Therefore ink can still escape when pressure builds up inside the printer. The pressure of the ink can push back the rubber which exerts only minimal pressure as only the elasticity of the rubber ensures a pressing force. Minimal pressure of the ink will cause leakage.

By sliding the rubber sheath over the opening of the needle the inner wall of the sheath can be damaged by sliding over the opening in the needle. The inner layer of material of the rubber sheath protrudes inside the hole of the needle due to the radial pressing force and is chamfered by edge of the hole at the needle edge. This abrasion can cause the sealing to be defective after a certain time.

A small amount of ink can be trapped between the sealing of the cartridge and the rubber sheath causing contamination of the coupling system and giving problems due to dried ink, etc.

An important drawback of all these coupling systems is that the ink flow rate is rather restricted due to the small diameter of the needle-like structures. The small opening causes a considerable pressure drop over the coupling, thus limiting the possible ink flow. This can be counteracted by applying a positive pressure on the outside of the ink container inside the ink cartridge.

In US 2001/12 038, herein incorporated by reference in its entirety for background information only, the connection is established using a compressive seal and a needle displacing the sealing ball while the ink bladder inside the cartridge is pressurized at the outside.

US 2002/0001009, herein incorporated by reference in its entirety for background information only, discloses an ink container slidably mounted on an ink supply station. The container has a collapsible ink reservoir in a pressurized chamber.

A drawback of the above-mentioned systems is that the opening of the printer to the ink cartridge is not closed off when no cartridge is attached so ink leakage is possible under certain conditions, e.g. due to pressure changes inside the printer. Some systems rely on the negative pressure inside the ink supply system in the printer to avoid leakage. This can however not be relied upon at all times.

Also when ink cartridges are pressurized the likelihood of leakage from a stored cartridge is greater than that of non-pressurized cartridges. Pressurized cartridges also demand higher fabrication standard to provide an air-tight housing. This makes them more expensive. Accidentally puncturing the outer shell of such cartridges also makes them inoperable.

Valve units of ink cartridges need to have a higher quality when pressure is maintained in a stored cartridge. This is undesirable as it makes the cartridges more expensive.

In U.S. Pat. No. 5,963,238, herein incorporated by reference in its entirety for background information only, a double valve system is used but as the connection is made a large quantity of air is included in the ink stream causing possible problems due to air bubbles. Also ink left at the outside of the coupling elements can dry and block the valve system in further use.

In U.S. Pat. No. 6,550,899, herein incorporated by reference in its entirety for background information only, the same problem exists, air is enclosed and when the valve pair is de-coupled ink is left at the outside giving possible problems due to drying.

In US 2003/202060, herein incorporated by reference in its entirety for background information only, a combination of a needle-like coupling element and a compressive seal cause problems after frequent use of the coupling system.

It is clear there is a need for a system for coupling an ink cartridge to an inkjet printer ensuring absolutely no leakage from the cartridge or printer and having a high cross-section allowing a high ink flow without the need for pressure assisted ink flow. Also problems inherent to sealing sliding over an opening need to be avoided.

SUMMARY OF THE INVENTION

An ink supply system for feeding ink from an ink cartridge to an inkjet printer includes a dry-break valve system and two coupling elements. Preferably, use is made of a hollow tappet rod as a coupling element. The valves in the system are automatically opened in a single action during coupling without introduction of air into the system. The system allows for high volume ink flow and prevents leakage from the ink cartridge and the printer due to pressure changes.

Specifically, an ink supply system is provided for feeding ink from an ink cartridge to an inkjet printer. The system includes a coupling system having: a first coupling element having a first valve, the first coupling element coupled to the ink cartridge; and a second coupling element having a second valve, the second coupling element coupled to the ink container for coupling with the first coupling element. The first and second valves form a fitting valve pair of a dry-break valve system to prevent leakage.

DETAILED DESCRIPTION OF THE PREFERRED EMBODIMENTS

While the present invention will hereinafter be described in connection with preferred embodiments thereof, it will be understood that it is not intended to limit the invention to those embodiments.

The drawbacks of prior art systems avoided and desired properties are obtained by an ink supply system for feeding ink from a cartridge to an inkjet printer having a coupling system with: a first coupling element 1 coupled to an ink container; and a second coupling element 2 coupled to the inkjet printer, wherein the coupling system has a dry-break valve system.

Figure 1:
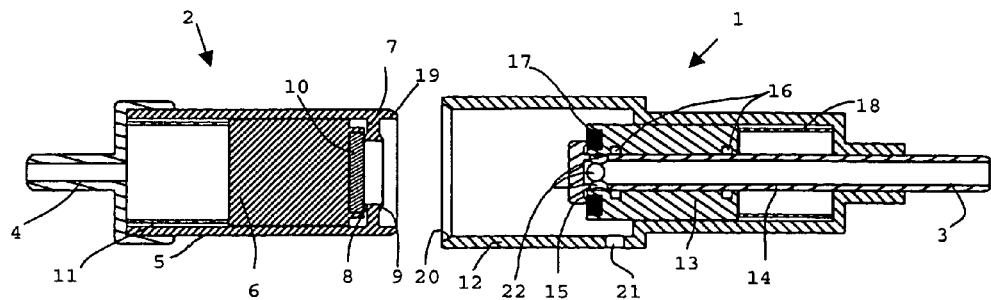
FIG. 1 illustrates two coupling elements of a coupling system when separated.

The coupling elements of a preferred embodiment are shown in FIG. 1. The first coupling element 1 shown on the right is coupled, preferably connected via a hose fitting 3 to the ink supply system of the inkjet printer, feeding ink to the header tank or inkjet printhead. The second coupling element 2 on the left is coupled, preferably connected via fitting 4 to the ink cartridge.

The coupling system comprises a dry-break valve system. This means that it provides a non-spill coupling and uncoupling action. An airtight seal is provided in both of the coupling elements. As the elements 1, 2 are coupled, no air is enclosed which would be locked-in in the ink supply ducts of the printer leading to problems in the printing process.

The coupling element 2 on the cartridge side includes:

housing 5 forming a cavity for containing valve 6 and for mounting the coupling element 2 in the cartridge. At the coupling side of the housing 5 an integrated ring 7 is provided with sealing edges 8, 9 on the inside and outside.

inside the housing 5 a valve 6 is slidably mounted. The outer surface of the valve 6 has ink channels located outside the inner sealing edge 8. These channels may be located at the cylindrical surface of the valve 6 or may be totally located inside the valve body.

an elastomer sealing 10 is fitted on top of the valve 6 to provide adequate sealing of the valve 6 when in contact with the inner sealing edge 8.

resilient means 11, usually a spring, urges the valve 6 towards the protruding inner sealing edge 8. Usually this is a metal spring but other resilient means can be used.

The coupling element 1 on the printers side is shown on the right of the figure. The outer part of the coupling element 1 is formed by a case 12 for holding the valve 13 and for receiving housing 5 during coupling. The case is rigidly combined with hollow tappet 14 rod having a seal edge 15 on the back-side. Valve 13 is slidably mounted over the hollow tappet rod 14. Inner sealing rings 16 provided leak-proof mounting of the valve 6 over the tappet rod 14. An outer sealing ring 17 is mounted at the forward looking face of the valve 13 to form a sealing with the sealing edge 15 of the tappet rod 14. Resilient means 18 urges the valve 13 towards the sealing edge 15 of the tappet rod 14.

Preferably the coupling system or the inkjet printer-cartridge combination is provided with a self alignment and auto-centering mechanism. In FIG. 1, the housing 5 of coupling element 2 and the case 12 of coupling element 1 provide an easy alignment system. Edges 19 and 20 are lightly chamfered to ensure easy fitting of the two coupling elements. The housing 5 and case 12 need not form an airtight fitting with each other. To ensure easy coupling, air should be allowed to flow in between the coupling elements 1 and 2 when fitted together.

During insertion of the cartridge in the printer, the cartridge needs to be aligning properly prior to engaging the two parts of the valve coupling. In the prior art this alignment needed special attention because of the fragile needle at the docking side of the coupling. A number of pin-hole concepts are described to align the cartridge with the docking station prior to engaging. The coupling system proposed in this invention is robust in itself and the design of the valve male and female body parts can be made auto-centering for instance by use of the chamfered parts. Sliding the ink cartridge into the printer can still be assisted with some guiding means, especially when the size and weight of the cartridge could make precise positioning by hand difficult.

Figure 2:
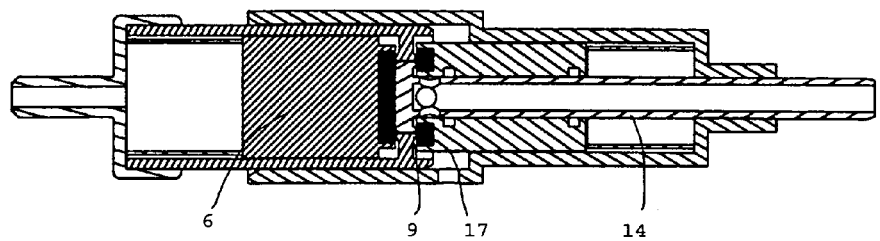
FIG. 2 illustrates coupling elements partially joined without opened valves.
Figure 3:
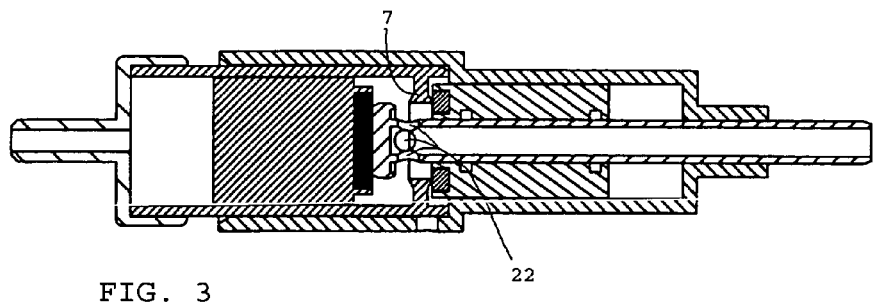
FIG. 3 illustrates coupling elements fully coupled and with open valves.

Next, the coupling action of the coupling system is described in relation to FIGS. 2 to 3. The system provides an coupling between an ink cartridge and an ink supply system resident in an ink jet printer with a minimum pressure drop at large ink flows up to 6 to 7 ml/min (determined by volume of the used drops, number of drops per dot, firing rate and the number of nozzles in the printhead). The invention includes dry-break male-female type valve coupling with a pressure drop equivalent to a 4 mm ID ink tube at a flow rate of 7 ml/min. The coupling allows for a low-cost ink supply system design using gravity force to establish ink flow. The coupling has the additional advantage of being non-spill and introduces no air in the ink system at docking and undocking. Male or female part of the valve can be integrated as part of a docking assembly at the printer side or cartridge assembly at the ink cartridge side.

The two coupling parts 1, 2 can be fitted together to obtain the situation as shown in FIG. 2. When the two coupling elements 1, 2 are fitted together first the housing 5 of the second coupling element 2 and the case 12 of the first coupling element 1 contact with each other. Due to the chamfered edges 19, 20 the two parts can be easily centered and aligned. As both coupling elements 1, 2 are aligned they can be further fitted together.

Air in between the chamber between coupling elements 1, 2 can easily evacuated to the outer surroundings. If the fitting of the case 12 and housing 5 is very exact one or more appropriate holes 21 can be provided to evacuate air from between the two coupling elements 1, 2.

The tappet rod 14 inside the casing 12 will fit inside the cavity formed by the housing 5 and the outside face of the valve 6 of the second coupling element 2. Fitting can be made easier when the edges are chamfered or when the cavity and the end of the tapped rod 14 are slightly made conical.

In some embodiments the valves could be kept spaced from each other but preferably as can be seen in FIG. 2 when both coupling elements 1,2 are joined, no air is enclosed to avoid introduction of air in the ink supply ducts of the printed. This would lead to possible malfunction of the printhead and defects in the printed articles. The valves thus form a fitting valve pair without an intermediate space.

In this situation tappet rod 14 is in contact with the outer face of the valve 6 in the second coupling element 2 and the outer sealing edge 9 of the housing of the second coupling element is in contact with the sealing ring 17 of the valve 13 of the first coupling element 1 forming a tight seal between the two coupling elements 1, 2.

As can be seen the sealing elements 10, 17 of the valves only make a pressing contact to the sealing edges 8, 9, 15 of the elements to be sealed. There is no sliding of valve elements of the assembly over the sealing elements 10, 16, 17. No uneven surfaces come into contact with sealing members during the coupled or uncoupled states and during coupling and uncoupling. This avoids premature wear of the seals. The force exerted when opening and closing the valves 6, 13 is always axial. No radial orientated forces are necessary to ensure good sealing of the coupling elements to each other. Radial seals 16 can be present sliding over the outer surface of the hollow tappet rod 14 inside the first coupling element 1. However, these seals 16 always encounter a smooth surface and the contact is not intended to open and close. This seal is always kept in a closed state.

Also no radial forces are needed to seal the openings for ink transfer as the elements 1,2 are in an uncoupled state.

In transition to the situation as depicted in FIG. 3, in a single action the two valves 6, 13 are opened simultaneously in a single motion by pressing the two coupling elements 1, 2 further together. Tappet rod 14 pushes the valve 6 opposite to the pressure of the spring 11 inside the housing 5 of the second coupling element 2 thereby opening the sealing contact between the inner sealing edge 8 of the housing 5 and the valve 6. Ink can flow between the inside of the cartridge via the fitting 4, and the ink ducts inside the valve 6 to the formed central chamber. At the same time the housing 5 of the second coupling element 2 pushes back the valve 13 against the pressure of the spring 18 into the first coupling element 1 so that the holes 22 provided in the hollow tappet rod 14 come free and connection is made between the formed central chamber and the ink supply system of the printer connected to fitting 3. Both valves 5 and 6 are in an open state and thus ink can flow freely from the ink cartridge to the printer. Ink ducts provided inside the valve 6 and the holes 22 provided at the end of the tappet rod 14 constitute a large cross section allowing for a high flow rate of the ink.

Preferably the coupling system is not self locking. As the coupling of both elements 1, 2 normally takes place in the printer itself, the coupling system will be unreachable for the operator performing change of cartridges. A locking mechanism is preferably provided between the printer and the outer shell of the cartridge itself. This locking mechanism will hold the cartridge in the printer and thus the coupled elements in place. A possible common known method is that a latch system is used, allowing easy locking of the cartridge upon insertion.

It is clear that the position of the two coupling elements 1,2 can be switched, i.e. coupling element 1 attached to the cassette and element 2 to the printer.

When unlocking the coupling system ink is, during release of the coupling elements, driven out of the formed central chamber into the hollow tappet rod 14 and the housing 5 of the second coupling element 1. As the central chamber is totally closing, valves 5, 6 are pushed forward by the resilient means 11 and 18, sealing means 10 and 17 come back into contact with the inner sealing edge 8 of the housing 5 and the backward sealing edge 15 of the tappet rod 14 thereby closing off the two coupling elements 1, 2 and avoiding leakage. The two coupling elements 1, 2 can be easily separated from each other. Air can flow in via opening 21.

No large forces are exerted upon the coupling so it can be made of cheap materials. Usually, with exception of the resilient means in the coupling elements, the elements can be substantially made of cheap synthetic elements such as different types of plastics. A lot of valve parts come however into contact with the ink jet ink. Chemical and physical compatibility must be guaranteed. Polyolefines like PE and PP are compatible with most inks and can be used for all rigid parts in the valve construction. Sealing materials are less universal. Fluorelastomers can be used with oil-based inks. EPDM is compatible with aqueous inks.

Preferably a more reliable coupling element is provided in the printer as this element is normally not replaced. On the other hand the coupling element which is part of the ink cartridge is replaced when exchanging the cartridge. As a consequence and preferably the coupling element of the cartridge can have lower technical specifications and will be cheaper.

Theoretically the valve does not insert air into the ink supply tubing. Due to non-zero tolerances on the manufacturing of some parts of the valve however, a small amount of air can be inserted into the ink supply system when coupling. This amount is estimated at 0.03 ml of air when dry coupling (first time only). Once a coupling has been established and the connection is uncoupled and coupled again, some valve parts have been wetted reducing the tolerance gap. Gaps or spaces in the valve assembly introduced by non-zero manufacturing tolerances can be reduced or even eliminated by use of fillers, like any mousse of foam type material. Preferably the foam material is of a type having isolated cells which can not absorb liquid ink.

The valve mechanism of second coupling element 2 can during transport and storage be protected from dust or damage of any kind by a seal removable by the operator prior to using the cartridge. In the case of a flexible bag type cartridge, the body of the female part can have a dedicated shape to make it suitable for a lot of flexible bag sealing and welding processes. The integration of the female part with the ink cartridge can also be based on a hose connection or a threaded connection.

In the preferred embodiment of the male part, a sealing ring 17 is forced against the head of the tappet rod 14 in order to close off the ink supply circuit to the print head when uncoupled from the cartridge. In an alternative embodiment the tappet rod 14 is not actively sealed when uncoupled, but is drawn back into a gasket where the ink meniscus in the play between the head of the tappet rod 14 and the gasket establishes the seal.

The invention provides a valve consisting of a docking part and a cartridge part. Coupling of these two valve parts does not necessarily mean that the valve is opened for ink flow; fluidic opening and closing of the valve can functionally be separate from the action of mechanical coupling or uncoupling of the two valve parts. A complete sealing is provided before a valve is opened. The invention however provides a valve that automatically opens the fluidic path when coupled, and closes the fluidic path when uncoupled.

Having described in detail preferred embodiments of the current invention, it will now be apparent to those skilled in the art that numerous modifications can be made therein without departing from the scope of the invention as defined in the appending claims.

Parts List:
1. first coupling element
2. second coupling element
3. hose fitting
4. hose fitting
5. housing
6. valve
7. integrated ring
8. inner sealing edge
9. outer sealing edge
10. sealing
11. resilient means
12. case
13. valve
14. hollow tappet rod
15. sealing edge
16. sealing ring
17. outer sealing ring
18. resilient means
19. chamfered edge
20. chamfered edge
21. air evacuation hole
22. tappet rod holes

The invention claimed is:

1. An ink supply system for feeding ink from an ink cartridge to an inkjet printer having a coupling system, the coupling system comprising:
a first coupling element comprising a first valve, said first coupling element coupled to the ink cartridge; and
a second coupling element having a second valve, said second coupling element coupled to the ink container for coupling with the first coupling element;
wherein the first and second valves form a fitting valve pair of a dry-break valve system without intermediate space.

2. The ink supply system according to claim 1 wherein the first and second valves each open by a single action during coupling.

3. The ink supply system according to claim 2 wherein the first and second valves open simultaneously.

4. The ink supply system according to claim 1 wherein the cartridge is for coupling by use of a latch system.

5. The ink supply system according to claim 1 wherein at least one of the first and second coupling elements comprises an alignment mechanism.

6. The ink supply system according claim 1 wherein at least one of the first and second coupling elements comprises a hollow tappet rod.

7. The ink supply system according to claim 1 wherein at least one of said first and second valves is spring loaded.

8. The ink supply system according to claim 1 wherein said first coupling element is comprised of synthetic material.

9. The ink supply system of claim 1 wherein the first coupling element is coupled to, and a part of the ink cartridge.

10. The ink supply system according to claim 1 wherein the valves of the coupling elements comprise:
seals which seal only by making a pressing contact; or
seals sliding over a smooth surface of the valve coupling elements.

11. The ink supply system according to claim 1 wherein in an uncoupled state of the coupling elements, openings for ink transfer are sealed by seals having a pressing contact.

12. An ink supply system for feeding ink from an ink cartridge to an inkjet printer having a coupling system, the coupling system comprising:
a first coupling element comprising a first valve, said first coupling element coupled to the ink cartridge; and
a second coupling element having a second valve, said second coupling element coupled to the ink container for coupling with the first coupling element;
wherein the first and second valves form a fitting valve pair of a dry-break valve system without intermediate space and wherein the valves of the coupling elements comprise seals which seal only by making a pressing contact, or seals sliding over a smooth surface of the valve coupling elements.

13. An ink supply system for feeding ink from an ink cartridge to an inkjet printer having a coupling system, the coupling system comprising:

a first coupling element comprising a first valve, said first coupling element coupled to the ink cartridge; and a second coupling element having a second valve, said second coupling element coupled to the ink container for coupling with the first coupling element, wherein the first and second valves form a fitting valve pair of a dry-break valve system without intermediate space and wherein in an uncoupled state of the coupling elements, openings for ink transfer are sealed by seals having a pressing contact.

14. An ink supply system for feeding ink from an ink cartridge to an inkjet printer having a coupling system, the coupling system comprising:

a first coupling element coupled to the ink cartridge and comprising a first valve, a hollow tappet rod and a first spring; and a second coupling element coupled to the ink container and comprising a second valve, a seal, and a second spring;

wherein the first and second coupling elements are joined together to provide (A) a fitting valve pair of the first and second valves where a head of the hollow tappet rod is in continuous contact with the seal due to resilient forces of the first and second springs, (B) an ink flow without a presence of air through the hollow tappet rod, and (C) a dry-break valve system whereby separation of the first and second coupling elements is provided without a presence or leakage of ink from the valves.

15. The coupling system of claim 14 further comprising an air evacuation hole in the first coupling element to allow air to escape from the system.

* * * * *